United States Patent
Zakharov (10) Patent No.: US 9,712,686 B1
(45) Date of Patent: Jul. 18, 2017

(54) PRINTER DIAGNOSTICS USING EXTERNAL MICROPHONE

(71) Applicant: KYOCERA Document Solutions Inc., Osaka (JP)

(72) Inventor: Oleg Y. Zakharov, Walnut Creek, CA (US)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 15/084,698

(22) Filed: Mar. 30, 2016

(51) Int. Cl.
*H04N 1/00* (2006.01)
*G06K 9/00* (2006.01)

(52) U.S. Cl.
CPC ....... *H04N 1/00029* (2013.01); *G06K 9/0051* (2013.01); *G06K 9/0055* (2013.01); *H04N 1/00119* (2013.01); *H04N 1/00323* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 6,772,633 B2 * | 8/2004 | Terry | G01M 13/028 73/587 |
| 7,997,140 B2 | 8/2011 | Perie | |
| 8,132,049 B2 | 3/2012 | Yasukawa et al. | |
| 8,588,630 B2 | 11/2013 | Kurimoto et al. | |
| 9,217,980 B2 * | 12/2015 | Sakharshete | G03G 15/6511 |
| 9,260,261 B2 * | 2/2016 | Adams, Jr. | B65H 43/04 |
| 2002/0091491 A1 * | 7/2002 | Jackson | G05B 19/4065 702/56 |
| 2011/0125300 A1 | 5/2011 | Jaiswal et al. | |
| 2012/0235929 A1 * | 9/2012 | Hongo | B65H 7/06 345/173 |
| 2013/0086427 A1 * | 4/2013 | Bae | G06F 11/0733 714/37 |

(Continued)

FOREIGN PATENT DOCUMENTS

JP 2002-205449 7/2002

*Primary Examiner* — Ming Hon
(74) *Attorney, Agent, or Firm* — McDonnell Boehnen Hulbert & Berghoff LLP (57) ABSTRACT

The present disclosure is directed to a printing device, a system, and a method. The printing device according to one embodiment includes a chassis substantially housing a sheet feeder, a sheet conveyor, and a print applicator; a microphone externally mounted to the chassis for converting audio signals sensed by the microphone external to the printing device to a raw analog electrical signal; an analog low-pass filter for filtering out high frequency harmonics from the raw analog electrical signal to result in a filtered electrical signal; a controller comprising an analog-to-digital port, a processor, and a memory. The controller receives the filtered electrical signal at the analog-to-digital port and samples the filtered electrical signal at a sample rate of at least twice a bandwidth of the filtered analog electrical signal to result in a sampled signal clip. The controller determines a time duration of a portion of the sampled signal clip associated with a print cycle event. The controller stores in the memory data associated with the sampled signal clip for comparison with a training signal clip associated with the print cycle event.

20 Claims, 8 Drawing Sheets

(56) References Cited

U.S. PATENT DOCUMENTS

| | | | |
|---|---|---|---|
| 2014/0077447 A1* | 3/2014 | Hongo | G03G 15/70 271/264 |
| 2014/0251016 A1 | 9/2014 | Adams, Jr. et al. | |
| 2015/0039640 A1* | 2/2015 | Garrett | G06F 17/30743 707/758 |
| 2015/0154205 A1* | 6/2015 | Grano | G06F 17/30064 705/14.16 |
| 2015/0235644 A1* | 8/2015 | Son | G10L 21/003 704/500 |

* cited by examiner

PRINTER DIAGNOSTICS USING EXTERNAL MICROPHONE

BACKGROUND

Unless otherwise indicated herein, the materials described in this section are not prior art to the claims in this application and are not admitted to be prior art by inclusion in this section.

In recent years, various types of printing devices have become popular for both business and consumer use. In addition to traditional black and white printers, color printers, scanners, copiers, fax machines, and other components are now common. Multifunctional products (MFPs), that support two or more of these operations, are also widely available. Another popular category of printing device is 3D printers, in which additive manufacturing techniques are used to create various three-dimensional objects.

Maintaining and troubleshooting any of these printing devices can be difficult and time-consuming, sometimes requiring human monitoring, which can be expensive and inefficient. For example, common problems to be identified with printing devices include degradation of a device by controlling a noise level relating to moving mechanical parts, decreased page-printing speed, paper jams and abnormal behavior, and user-related activities, such as open trays and open covers, for example.

SUMMARY

The present application discloses embodiments that relate to printing devices, systems, and methods in which an external microphone is used for printer diagnostics. By capturing and processing an externally sensed audio signal associated with a printing device, an operational status condition can be determined for the printing device.

In one aspect, the present application describes a printing device having a chassis substantially housing a sheet feeder, a sheet conveyor, and a print applicator; a microphone externally mounted to the chassis for converting audio signals sensed by the microphone external to the printing device to a raw analog electrical signal; an analog low-pass filter for filtering out high frequency harmonics from the raw analog electrical signal to result in a filtered electrical signal; a controller comprising an analog-to-digital port, a processor, and a memory. The controller receives the filtered electrical signal at the analog-to-digital port and samples the filtered electrical signal at a sample rate of at least twice a bandwidth of the filtered analog electrical signal to result in a sampled signal clip. The controller determines a time duration of a portion of the sampled signal clip associated with a print cycle event. The controller stores in the memory data associated with the sampled signal clip for comparison with a training signal clip associated with the print cycle event.

In a different aspect, the present application describes a printer diagnostics system including a printing device and a server communicatively connected through a network to the printing device via a communication interface of the printing device. In addition to the communication interface, the printing device includes a chassis substantially housing a sheet feeder, a sheet conveyor, and a print applicator, a microphone externally mounted to the chassis for converting audio signals sensed by the microphone external to the printing device to a raw analog electrical signal, an analog low-pass filter for filtering out high frequency harmonics from the raw analog electrical signal to result in a filtered electrical signal, and a controller comprising an analog-to-digital port, a processor, and a memory. The controller receives the filtered electrical signal at the analog-to-digital port and samples the filtered electrical signal at a sample rate of at least twice a bandwidth of the filtered analog electrical signal to result in a sampled signal clip. In addition, the controller determines a time duration of a portion of the sampled signal clip associated with a print cycle event and stores in the memory data associated with the sampled signal clip for comparison with a training signal clip associated with the print cycle event. The server transmits the training signal clip to the printing device. The training signal clip is specific to a particular model designation of the printing device.

In a third aspect, the present application describes a printer diagnostics method that includes receiving, at a printing device, a training signal clip from a server, where the training signal clip is specific to a particular model designation of the printing device. The method also includes sensing an audio signal at a location external to the printing device, where the audio signal originates substantially from the printing device. The method further includes converting the sensed audio signal to a raw analog electrical signal and low-pass filtering out high frequency harmonics from the raw analog electrical signal to result in a filtered electrical signal. The method yet further includes sampling, at a controller, the filtered electrical signal at a sample rate of at least twice a bandwidth of the filtered analog electrical signal to result in a sampled signal clip, and determining, at the controller, a time duration of a portion of the sampled signal clip associated with a print cycle event. The method also includes determining whether the sampled signal clip differs from the training signal clip more than an assigned threshold, and upon determining that the sampled signal clip differs from the training signal clip more than an assigned threshold, providing an exception notification.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Example methods, devices, and systems are described herein. Any example embodiment or feature described herein is not necessarily to be construed as preferred or advantageous over other embodiments or features. The example embodiments described herein are not meant to be limiting. It will be readily understood that certain aspects of the disclosed methods, systems, and devices can be arranged and combined in a wide variety of different configurations, all of which are contemplated herein.

Furthermore, the particular arrangements shown in the figures should not be viewed as limiting. It should be understood that other embodiments might include more or less of each element shown in a given figure. In addition, some of the illustrated elements may be combined or omitted. Similarly, an example embodiment may include elements that are not illustrated in the figures.

I. Overview

Example embodiments utilize a microphone placed at a location outside, or external to, a chassis, or housing, of a printing device, such as a printer, copier, scanner, facsimile machine, or multi-function peripheral, for example. In some embodiments, the microphone is externally mounted to the chassis of the printing device. The microphone receives audio inputs from its external location and acts as a transducer to convert the audio inputs to a raw analog electrical signal. The analog signal is low-pass filtered (using an analog filter) to remove high-frequency components (such as noise and other harmonic components that are not of interest) and is converted to a digital signal by sampling at a rate that is at least twice the bandwidth of the filtered analog electrical signal. Parameters or coefficients of that digital signal, such as frequency, amplitude, and/or duration) are then compared to corresponding parameters or coefficients of a training signal. The training signal may be, for example, specifically designed for use with the particular make and model of the printing device from which the audio signals were received by the microphone. By identifying differences between the parameters or coefficients of the digital signal with those of the training signal, possible exceptions (e.g. malfunctions or needs for service) may be identified and acted upon. As a result, embodiments of the present application may provide for diagnostics of printing device.

In some embodiments, one or more of the above functions are performed by a relatively low-cost controller having a relatively low-speed central processing unit (CPU). The low-pass analog filtering makes it possible to use such a controller. The controller comprises an analog-to-digital port, a processor (CPU), and a memory, and can perform functions including the analog-to-digital conversion, the low-pass filtering, the sampling, and the comparison of the parameters or coefficients of the filtered, sampled digital signal with the parameters or coefficients of the training signal. In one example, the comparison includes the controller determining a time duration of a portion of the sampled signal clip associated with a print cycle event and storing in the memory data associated with the filtered, sampled digital signal for comparison with the training signal clip associated with the print cycle event. The print cycle event may be, for example, a starting of a motor of the printing device, a warming-up of the motor of the printing device, a clapping of a sheet feeder, a conveying of a printing medium in the printing device, a rolling of a sheet separation roller, and an outputting of the printing medium in an output tray of the printing device.

A printer diagnostics system according to embodiments described herein may include a printing device as described above and a server communicatively connected through a network to the printing device or controller via a communication interface of the printing device or controller. The server transmits the training signal clip to the printing device. The training signal clip is specific to a particular model designation of the printing device. The result(s) of the comparison between the filtered, sampled digital signal and the training signal may be transmitted to the server. Such result(s) may be used for servicing, accounting, or other purposes, for example.

In some embodiments, the printing device to which the microphone is connected is of particular importance, such as for a special customer (e.g. emergency or hospital setting) or serving as a special test device. In other embodiments, the printing device is a standard device for which diagnostics capabilities are to be provided or improved.

II. Example Systems

Figure 1:
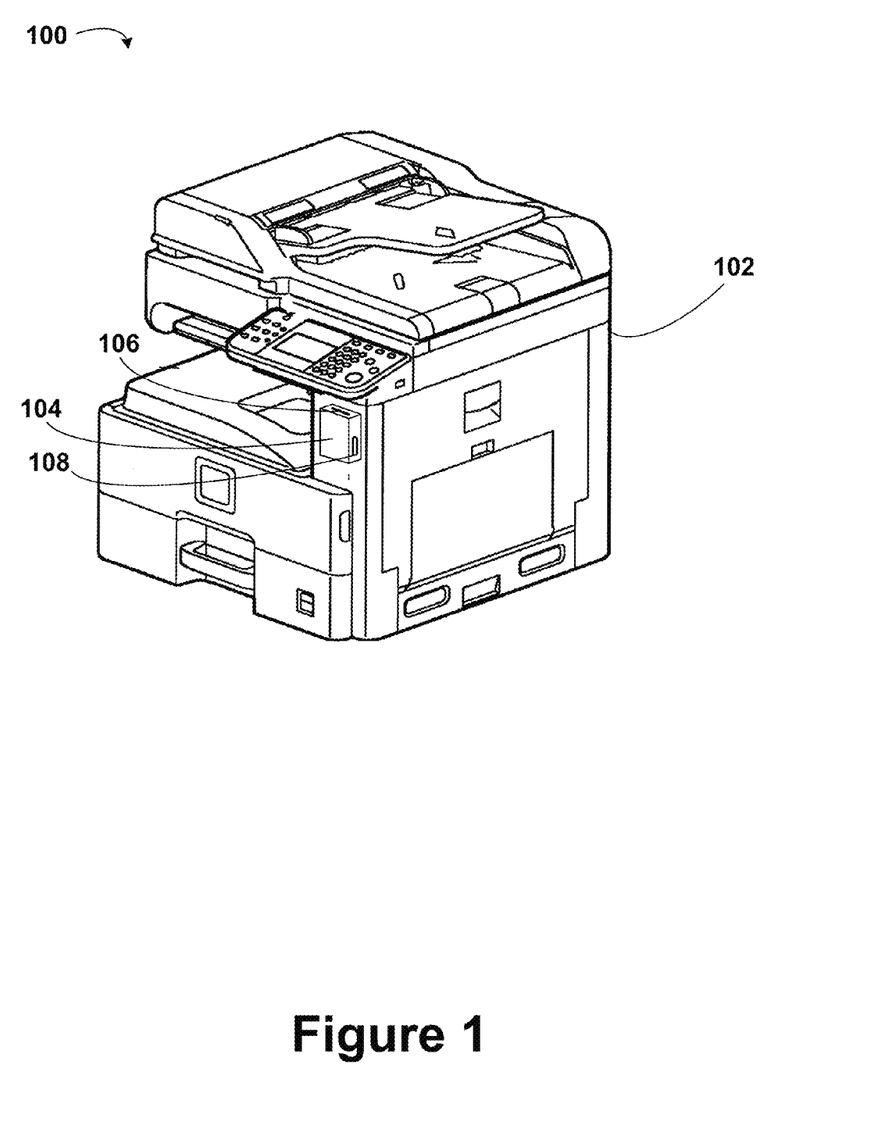
FIG. 1 is perspective diagram of a printing device, according to example embodiments.
Figure 2:
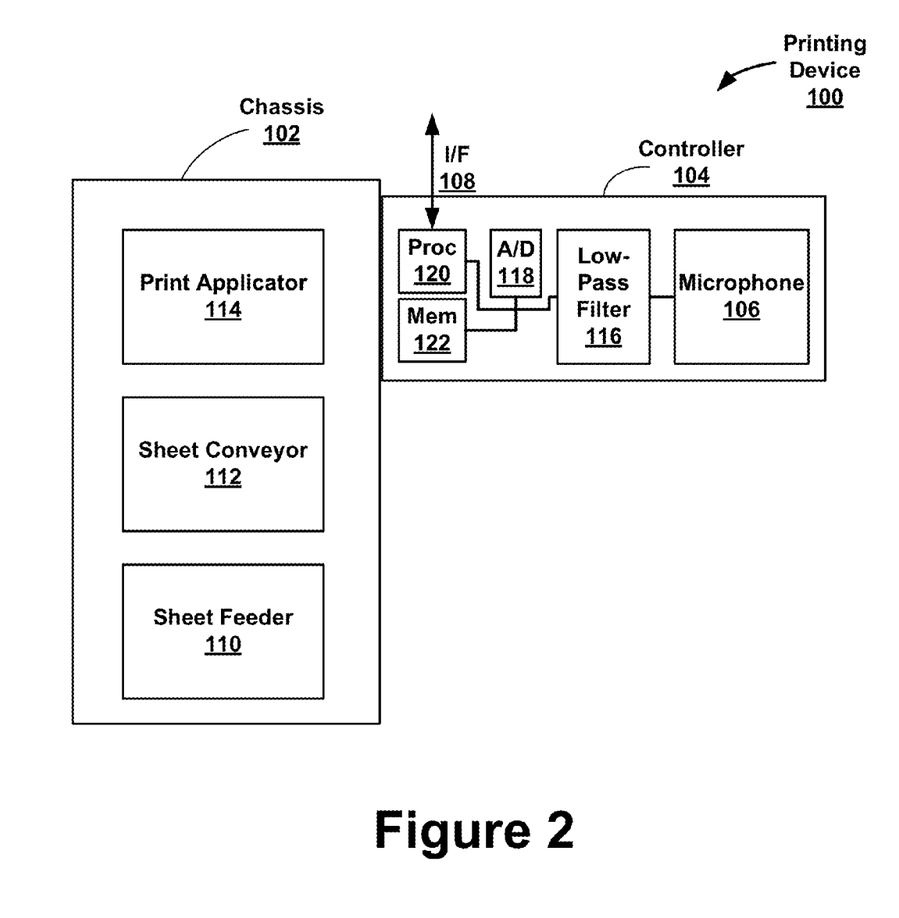
FIG. 2 is a block diagram of a printing device, according to example embodiments.
Figure 3:
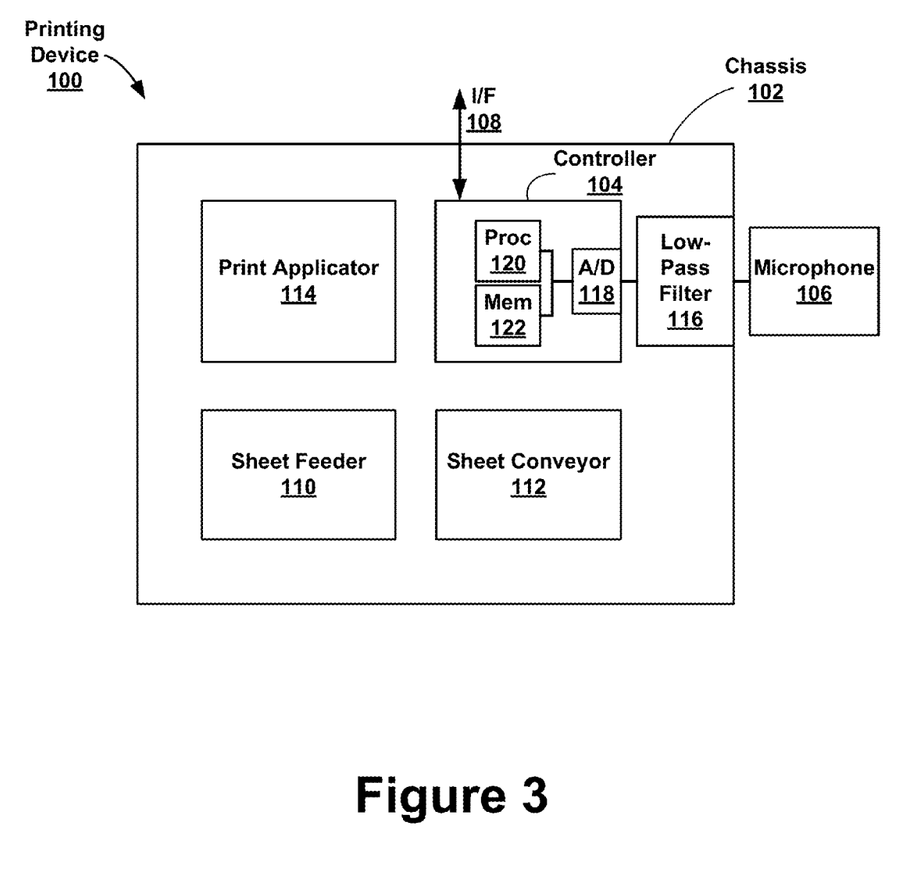
FIG. 3 is a block diagram associated with mechanical operation of a printing device, according to example embodiments.

FIG. 1 is perspective diagram of a printing device 100, according to example embodiments. FIGS. 2 and 3 illustrate two possible configurations (of many) of the printing device 100. As shown in FIG. 1, the printing device 100 includes a chassis 102 (or body) housing (containing or including) components of a typical printing device, such as a processor, memory, power supply, drum, laser diode and other optical components, toner cartridges, fuser, rollers, guides, motors, sensors, belts, gears, and other moving and non-moving parts. The particular type of printing device 100 will determine which typical components are included. For example, an inkjet printer will lack the laser diode and some of the other optical components included in the above list, but will instead comprise ink cartridges, print heads, and various cleaning mechanisms. As yet another example, a 3D printer will comprise a number of linear actuator motors, 3D printing material (e.g. plastic), and a printing platform, among others.

Common among any of the above printing devices, including printing device 100, is that the printing process produces detectable audible sound, due to the presence of many moving mechanical parts, for example. While some types of devices will operate at different volumes and frequencies than other types of devices, the Applicant has observed that for any particular printing device model (e.g. similar or identical mechanical construction and similar or identical firmware and/or software) performing a particular printing process, one can expect an associated reproducible audio signature (audio signals and noise) that is detectable at a location external to the printing device. In the case of the printing device 100, which is illustrated as a laser printing device, the mechanical parts within the chassis 102 move in a specific order (sequence) during each print cycle event or operation, such as scanning, single-side printing, duplex printing, etc. As a result, each moving part produces a particular sound, which has a specific frequency, amplitude (intensity), sequence order, and time duration.

The printing device 100 includes an externally mounted microphone 106 to detect an audio signal representative of the audible sounds referenced above. In the example shown, the microphone 106 is integrated with an audio controller 104, which is mounted on the chassis 102. The external mounting location provides a number of possible benefits, which may include reduced noise, ease in installing in existing printing devices, and cost (due to being able to use an existing, relatively low-cost audio controller, for example. In addition, in some embodiments, external mounting allows the microphone and audio processing to be more easily powered by a source remote or separate from the power supply of the printing device, which will enable diagnostics operation even if the printing device malfunctions.

The printing device 100 of FIG. 1 also includes a communication interface 108 integrated with the audio controller 104 to allow communications of diagnostic-related information or other data, such as to or from a mobile device, server, or other device. The communication interface 108 may be a physical (e.g. wired) connection, such as a USB or Ethernet port, or it may be a wireless interface, such as via WiFi, Bluetooth, or other wireless protocol. In other embodiments, the communication interface 108 may simply be a user interface, to communicate diagnostics information locally, such as to a service technician who is physically present at the printing device 100.

FIG. 2 is a block diagram of the printing device 100, according to example embodiments. In the example of FIG. 2, the printing device 100 includes the entire controller 104 outside or external to the chassis 102. In that sense, the controller 104 is self-contained from the rest of the printing device 100. The controller may even be separately powered from the rest of the printing device 100, such as via batteries or an AC power supply (not shown), which would provide for better reliability in the event of a malfunction in the printing device 100, such as a failure in a main power supply for the printing device 100.

As conceptually shown, the printing device 100 includes the chassis 102, housing a number of mechanical parts, only three (a sheet feeder 110, sheet conveyor 112, and print applicator 114) of which are shown, for ease of illustration. Each of these parts includes a number of mechanisms and subparts, such as rollers, motors, and gears, for example. The chassis 102 will also house many other electrical and mechanical parts besides those shown; however, not all parts will generate audio signals. Further details regarding generation of audio signals will be described with reference to FIG. 5.

The sheet feeder 110 may feed (provide) sheets to or from a printing or scanning portion of the printing device 100 from a starting position, such as a paper tray or automatic document feeder, and may include an arrangement of motors, rollers, guides, and/or suction mechanisms to move paper or other media from one location of the printing device 100 to another location. The sheet conveyor 112 moves sheets internally in the printing device 100, such as to a drum and/or transfer roller of the printing device 100. The print applicator 114 includes the drum, fusing section, toner, and other mechanisms that apply an image to a sheet (e.g. of paper). The details regarding the sheet feeder 110, sheet conveyor 112, and print applicator 114 are not important for purposes of this example; these three parts are simply examples of moving parts that generate audible sounds (i.e. audio signals).

The controller 104 of the printing device 100 shown in FIG. 2 is mounted external to the chassis 102. This mounting may differ depending on the particular embodiment. For example, the controller 104 could be physically secured to the exterior of the chassis 102, such as by glue, mechanical fasteners (e.g. screws, bolts, etc.), hook-and-loop fasteners (e.g. Velcro®), magnets, suction, or other fastening technique. The external mounting may also be such that the controller 104 is physically separate from (not touching) the chassis 102, but close enough so that the audio signals can still be detected by the microphone 106 of the controller 104. In each of these embodiments, the microphone 106 is mounted external to the chassis 102 of the printing device, whether the microphone 106 is part of another component, such as the controller 104, for example.

The controller 104 of FIG. 2 includes the microphone 106, a low-pass (or high-frequency cut-off) filter 116, an analog-to-digital converter or port 118, a processor 120, and a memory 122. In the example shown, the controller 104 also includes the communication interface 108, described above with respect to FIG. 1.

The microphone 106 is an acoustic-to-electric transducer that senses audio signals, such as through sensing air pressure changes, and converts the signals to electrical signals, such as by electromagnetic induction, capacitance change, or piezoelectricity. The microphone 106 is externally mounted to the chassis 102 (in the example of FIG. 2, via the controller 104) for converting audio signals sensed by the microphone external to the printing device 100 to a raw analog electrical signal, which is provided to the low-pass filter 116.

The low-pass filter 116, otherwise known as a high-frequency cut-off filter, filters out high frequency harmonics from the raw analog electrical signal to result in a filtered electrical signal. The unfiltered audio signals consist of high-frequency noise amplitude-modulated by a low-frequency signal originating from moving parts in the image forming apparatus. After low-pass filtering, only the low-frequency wavelets remain, which relate to moving mechanical parts of the printing device 100, such as the sheet feeder 110 moving a sheet of paper, a transfer belt being moved, or a drum being rotated, for example. This filtering essentially narrows the spectrum of the signal, which allows a lower sampling rate during digitization (quantitation), as described below. A lower sampling rate allows for a less expensive processor 120, with a low-speed CPU. This also allows for the digitized sampled data to be stored in a more compact format, which can reduce the cost of the memory 122 as well, since a smaller-sized RAM can be used.

The analog-to-digital converter or port 118 (hereinafter ADC 118) of the controller 104 converts the filtered electrical signal into a sampled (i.e. digital) signal. In some embodiments, the ADC 118 samples the filtered electrical signal at a sample rate of at least twice a bandwidth of the filtered analog electrical signal to result in the sampled signal, but not substantially more than twice the bandwidth (which allows for the use of a lower speed, less expensive CPU). This sampling rate is based on the Shannon sampling theorem, which essentially states that, for a function containing no frequencies higher than a bandwidth B (in Hz), a sufficient sample rate is twice the bandwidth B, in samples per second. Therefore, to quantize an audio signal below 600 Hz, the sampling rate needs to be only 1200 consecutive samples per second. When the filtered electrical signal is of finite duration (e.g. corresponding to a print cycle event), the sampled signal is referred to as a sampled signal clip.

The sampled data clip produced by the controller 104 (e.g. via the ADC 118) includes a sequence of numbers corresponding to parameters of the sampled signal. According to some embodiments, the parameters are coefficients corresponding to frequency, amplitude, and or time duration of sampled signal clip.

The processor 120 of the controller 104 may include one or more general purpose processors, central processing units (CPUs), microcontrollers, CPU cores, and/or one or more special purpose processors (e.g., digital signal processors (DSPs), field programmable gated arrays (FPGAs), application specific integrated circuits (ASICs), etc.). The processor 120 can be configured to execute computer-readable program instructions that are contained in the memory 122 and/or other instructions as described herein. In various embodiments set forth herein, the processor provides computational functionality for sampling the analog signal (through the ADC 118), for example.

The processor 120 of the controller 104 compares at least one parameter of the sampled signal clip to at least one corresponding parameter of a training signal clip (described in further detail below) associated with a particular print cycle event. The processor 120 of the controller 104 determines whether the difference between those two parameters is within an assigned threshold for the print cycle event. If so, then the printing device 100 is likely operating properly. If not, then the printing device may have an issue, such as a defective mechanical part, decreased page-printing speed, a paper jam, abnormal behavior, and/or a user-related issue, such as an open tray or open cover, for example.

In some embodiments, the controller 104 builds (and stores in the memory 122) an array of coefficients for the sampled data clip produced by the controller 104 (e.g. via the ADC 118) and compares each array with a limited set of training arrays in order to determine whether an exception has occurred. For example, the arrays corresponding to amplitude (i.e. volume) preferably consist of positive values of intensity (converted from positive and negative values of amplitude samples). Rounding allows for a smaller number of enumerated values that need to be presented in an array of sample data, which reduces a resolution of digitizing). For example, in an array corresponding to amplitude, levels of intensity can be rounded to enumerated values corresponding to "no signal" (e.g. 0), "low level" (e.g. 1), "high level" (e.g. 2), or "peak" (e.g. 3) and stored in the memory 122. In order to allow for meaningful comparison, the training array(s) are preferably composed in the same manner, using empirical testing with a control printing device of the same model and type.

Upon determining that there is an issue with printing device 100 (i.e. the difference is outside the assigned threshold), then the controller 104 provides an exception notification, according to some embodiments. For example, in embodiments in which the controller 104 includes a communication interface 108, then the exception notification may be transmitted to a remote computer or other device, such as a server (e.g. a server from which the training signal was received by the controller 104 for comparison with the sampled signal clip).

The memory 122, as described above, may store arrays used for comparison by the processor 120 of the controller 104, and may comprise volatile and/or non-volatile data storage and can be integrated in whole or in part with the processor 120. The memory 122 may store program instructions, executable by the processor 120, and data that are manipulated by these instructions to carry out the various methods, processes, or functions described herein. Alternatively, these methods, processes, or operations can be defined by hardware, firmware, and/or any combination of hardware, firmware, and software. Therefore, the memory 122 may include a tangible, non-transitory, computer-readable medium, having stored thereon program instructions that, upon execution by one or more processors 120, cause the controller 104 and/or the printing device 100 to carry out any of the methods, processes, or functions disclosed in this specification or the accompanying drawings.

The communication interface 108 may be a physical (e.g. wired) connection, such as a USB or Ethernet port, or it may be a wireless interface, such as via WiFi, Bluetooth, or other wireless protocol. Network input devices can include wired network receivers and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of networks 120 and/or 125, and/or wireless network receivers and/or transceivers, such as a Bluetooth transceiver, a Zigbee transceiver, a Wi-Fi transceiver, a WiMAX transceiver, a wireless wide-area network (WWAN) transceiver and/or other similar types of wireless transceivers configurable to communicate via a wireless network. In other embodiments, the communication interface 108 may simply be a user interface, to communicate diagnostics information locally, such as to a service technician who is physically present at the printing device 100. In such a case, the communication interface 108 may include user input devices, network input devices, sensors, and/or other types of input devices. For example, input devices can include user input devices such as a touch screen, a keyboard, a keypad, a computer mouse, a track ball, a joystick, a camera, a voice recognition module, and/or other similar devices. Output devices can include user display devices, audible output devices, network output devices, and/or other types of output devices. User display devices can include one or more printing components, liquid crystal displays (LCD), light emitting diodes (LEDs), lasers, displays using digital light processing (DLP) technology, cathode ray tubes (CRT), light bulbs, and/or other similar devices. Audible output devices can include a speaker, speaker jack, audio output port, audio output device, headphones, earphones, and/or other similar devices. Other types of output devices can include, but are not limited to, vibration devices, haptic feedback devices, and non-visible light emission devices; e.g., devices that emit infra-red or ultra-violet light. Other output devices are possible as well.

FIG. 3 is a block diagram of the printing device 100, according to example embodiments. The printing device 100 of FIG. 3 is similar to the printing device 100 of FIG. 2, and differs only in the physical location of the controller 104. In FIG. 3, the controller 104 is shown as located inside the chassis 102, while the microphone 106 is still mounted external to the chassis 102. In addition, the low-pass filter 116 is illustrated as a discrete component separate from the controller 104 to demonstrate that some or all of the components of the controller 104 shown in FIG. 2 may be standalone components that are not physically part of the controller 104, as long as the components are in appropriate communication, so that the filtering, digitizing, processing sequence can occur.

Figure 4:
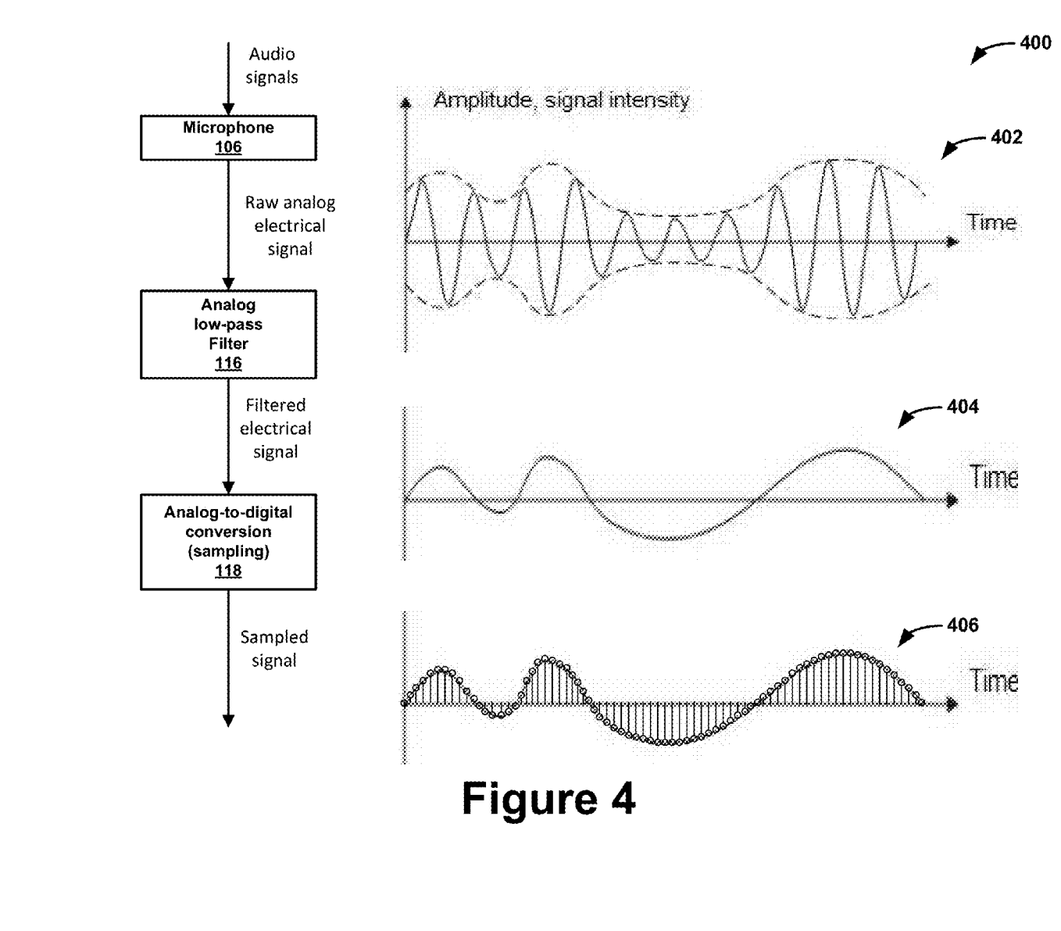
FIG. 4 is a schematic diagram illustrating processing of an externally sensed audio signal, according to example embodiments.

FIG. 4 is a schematic diagram illustrating processing 400 of an externally sensed audio signal, according to example embodiments. The left side of FIG. 4 illustrates the sequence described above, with respect to FIGS. 2 and 3, relating to sensing audio signals and converting them to analog electrical signals 402 (via the microphone 106), low-pass filtering the analog electrical signal (via analog low-pass filter 116) to create a filtered analog signal 404, and quantizing the filtered analog signal (via the ADC 118) to create a sampled signal clip 406. The controller 104 uses the sampled signal clip 406 to create an array to store in the memory 122 for comparison with one or more arrays corresponding to training clip(s) (e.g. for the particular model of the printing device 100).

Figure 5:
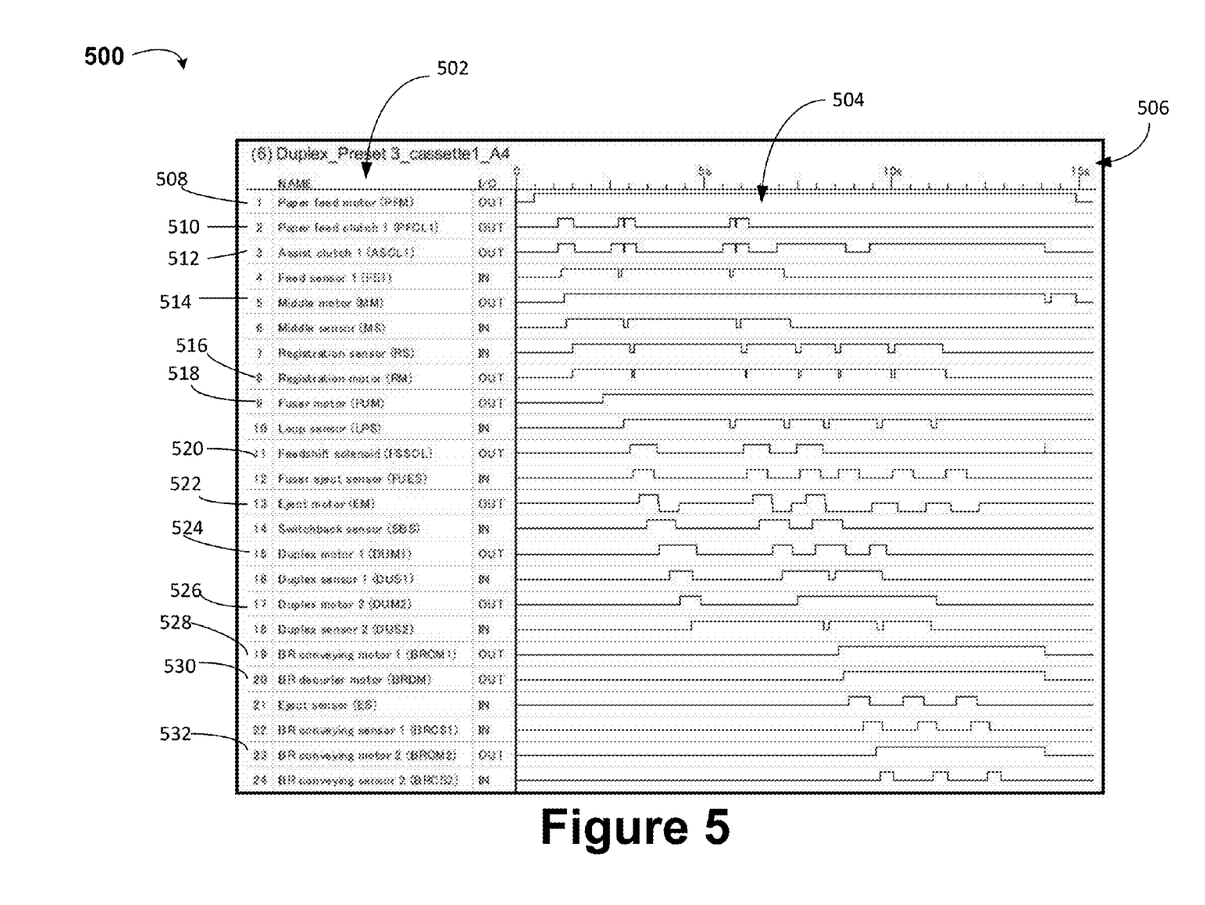
FIG. 5 is an example timing diagram illustrating a sequence of print cycle events, according to example embodiments.

FIG. 5 is an example timing diagram illustrating a sequence 500 of print cycle events, according to example embodiments. The sequence 500 includes a plurality of example, print cycle events 502, along with indications of activity (e.g. pulses) that take place during a time duration, as reflected by the relative location of pulses with respect to the time axis 506, which is shown spanning form 0 to 15 seconds. In the example shown, the print cycle events 502 that could generate audible sound include activation(s) of a paper feed motor 508, paper feed clutch 510, assist clutch 512, middle motor 514, registration motor 516, fuser motor 518, feedshift solenoid 520, eject motor 522, duplex motors 524 and 526, conveying motor 528, decurler motor 530, and conveying motor 532. It should be noted that FIG. 5 merely shows a sequence of events that may include corresponding audio signals; the figure does not show an actual audio signal representation. From such a sequence 500, a training signal can be created by executing the sequence 500 and processing the resulting audio signals using the physical setup shown in FIGS. 1-3, for example, with a control (i.e. known) printing device 100. Such a control printing device 100 may be a printing device of a certain model, whose operation has been confirmed to be free of any malfunctions or other issues. Alternatively, the control printing device 100 could be the printing device 100 for which diagnostics are to be performed, but with the training signal array created and stored in the memory 122 at a time when the printing device 100 is known to be properly functioning (e.g. during initial installation).

Figure 6:
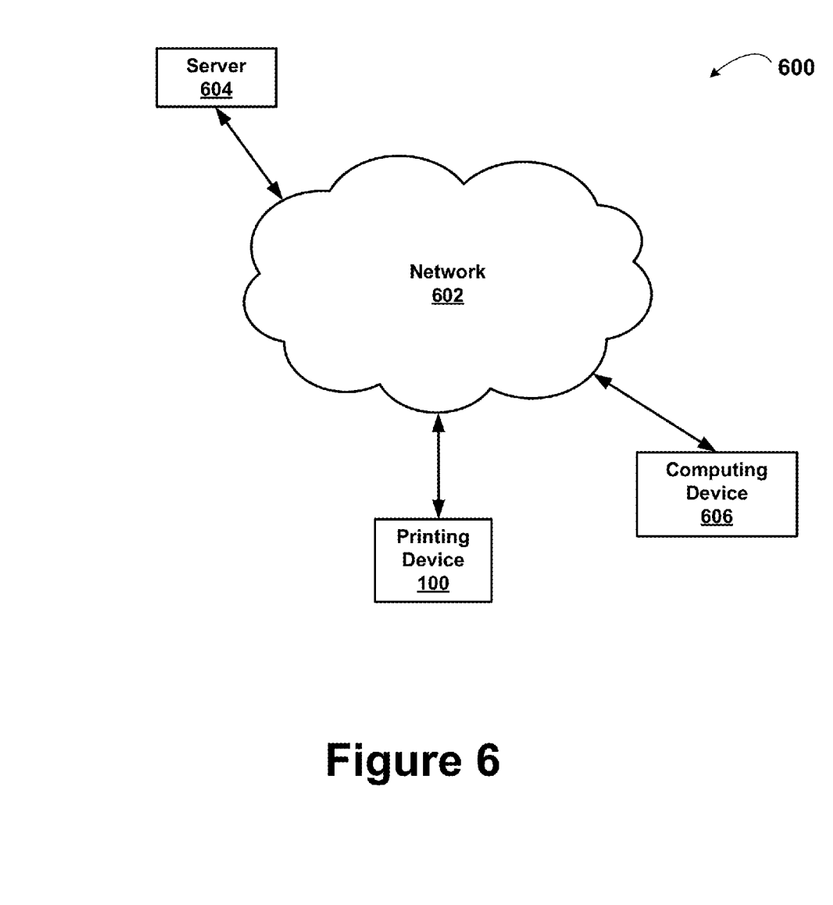
FIG. 6 is a block diagram of a printer diagnostics system, according to example embodiments.

FIG. 6 is a block diagram of a printer diagnostics system 600, according to example embodiments. As described above with respect to FIGS. 1-3, the controller 104 may include a communications interface 108. In some embodiments the communications interface 108 provides a capability to communication over a network 602 with a server 604 (e.g. a remote computer). The server 604 may, for example, provide one or more training signals (including corresponding arrays) via the network 602 to the printing device 100. Such a cloud-based solution may allow for updates of training signals when firmware of the printing device 100 is updated, for example. In addition, a connection via the network 602 to the server 604 may allow for some diagnostic functions to be performed at the server (server-side) rather than at the controller 104 of the printing device 100. For example, the printing device 100 (via the controller 104) may transmit at least a portion of the sampled signal clip (e.g. a corresponding array) via the network 602 to the server 604 for comparison with one or more training clips.

Also shown in FIG. 6 is a computing device 606 connected to the network 602. Such a computing device 606 may allow a user (e.g. a service person) to obtain diagnostics information from the printing device, such as information stored in the memory 122 of the controller 104. Such information could include results of comparisons between parameters of sampled signal clips and parameters of training signals, and could allow the user to determine whether the printer 100 is functioning properly.

Figure 7:
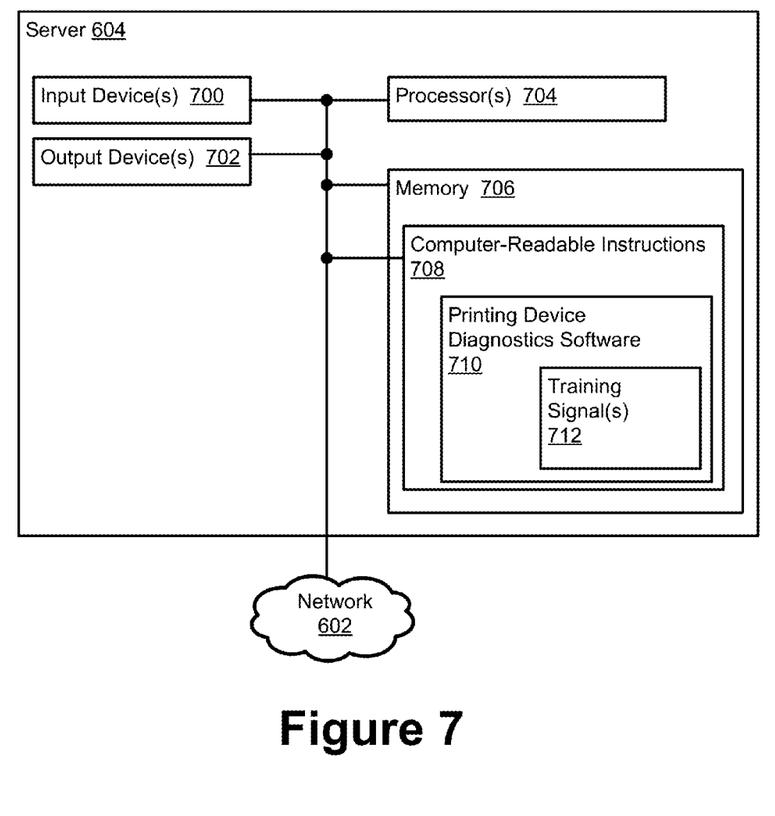
FIG. 7 is a block diagram of a server in a printer diagnostics system, according to example embodiments.

FIG. 7 is a block diagram of the server 604, according to example embodiments. The server 604 is shown with a connection to the network 602 and includes input device(s) and output device(s) 702 to allow for user interaction with the server 604. The server 604 also includes one or more processor(s) 704 and memory 706, which may be of the types described above for processor 120 and memory 122. The memory 706 stores computer-readable instructions 708, which may include printing device diagnostics software 710, including one or more training signals, such as in the form of one or more training signal arrays.

III. Example Processes

Figure 8:
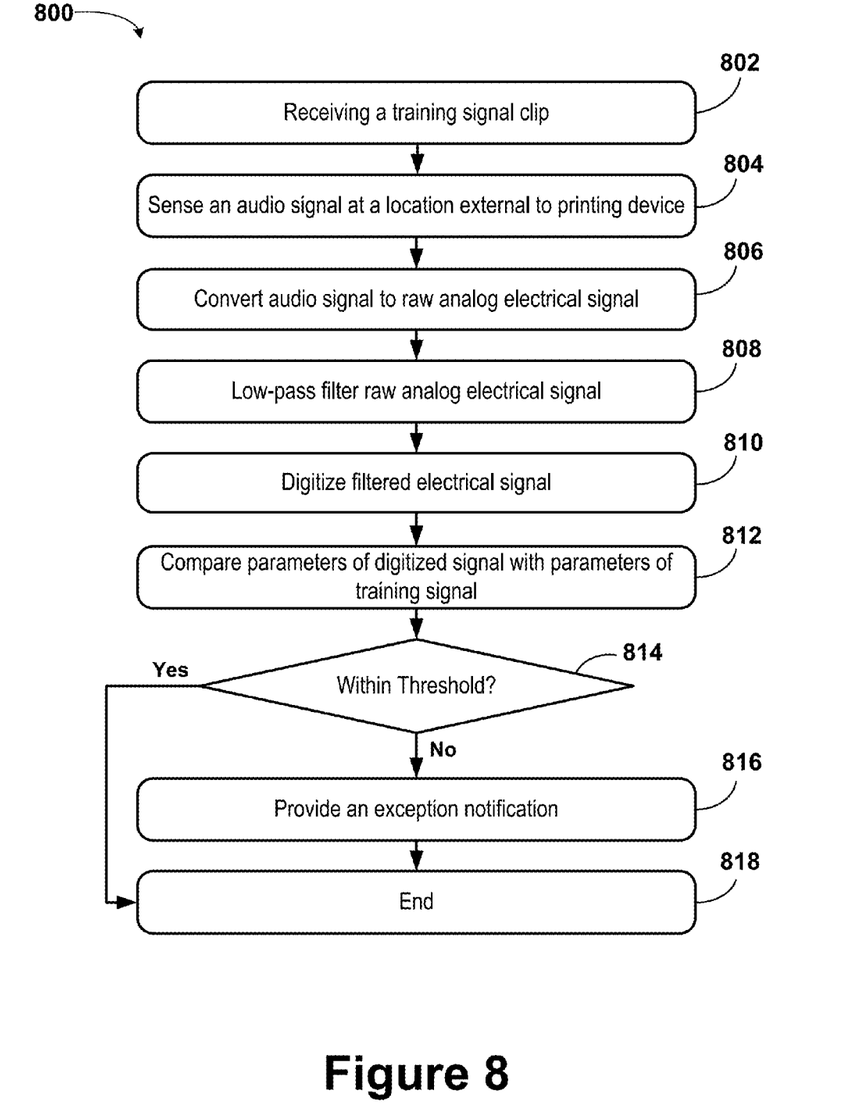
FIG. 8 is a flow diagram illustrating a printer diagnostics method, according to example embodiments.

FIG. 8 is a flow diagram illustrating a printer diagnostics method 800, according to example embodiments. The method 800 may, for example, be performed in whole or in part at the printing device 100 or at the controller 104 of the printing device 100. The blocks 802-818 may be performed in an order other than as illustrated in FIG. 8. In addition, one or more blocks may be omitted in some embodiments.

The method 800 includes, at block 802, receiving a training signal clip. For example, the printing device 100 may receive one or more training signal clips, such as arrays of numbers (e.g. parameters or coefficients) corresponding to frequency/bandwidth, amplitude/intensity, or time duration, for example, for one or more print cycle events. For example, a motor starting may be one such print cycle event, and may have a frequency/bandwidth of 200 Hz., an amplitude/intensity of "low" (in the four-value enumerated set described above), and a time duration of 2-5 seconds. Other print cycle events, such as a drum rotating, could have different values than for the motor starting. The training signal clip could be specific to a particular model designation of the printing device, according to some embodiments.

Block 804 of the method 800 includes sensing an audio signal at a location external to the printing device, where the audio signal originates substantially from the printing device. Such sensing is performed by the microphone 106. Audio signal components originating from other than the printing device 100 can be minimized through the use of a direction microphone, for example. As describe above, the microphone 106 may be externally mounted to a chassis 102 of the printing device 100, where the chassis 102 substantially houses a sheet feeder 110, a sheet conveyor 112, and a print applicator 114 for the printing device.

Block 806 of the method includes converting the sensed audio signal to a raw analog electrical signal, which, like block 804, is also performed by the microphone 106.

Block 808 of the method 800 includes low-pass filtering out high frequency harmonics from the raw analog electrical signal to result in a filtered electrical signal. This low-pass filtering is performed by a low-pass filter, such as one located in the controller 104 or electrically connected between the microphone 106 and controller 104 (perhaps with various other intervening circuit components). As described above, low-pass filtering allows for a lower sampling rate, which, in turn, allows for a lower speed CPU in the controller 104.

Block 810 includes digitizing the filtered electrical signal. This digitizing includes the controller 104 sampling the filtered electrical signal at a sample rate of at least twice a bandwidth of the filtered electrical signal to result in a sampled signal clip.

Block 812 includes comparing parameters of the digitized signal with parameters of a training signal, such as a training signal clip associated with at least one print cycle event (e.g. a starting of a motor of the printing device, a warming-up of the motor of the printing device, a clapping of a sheet feeder, a conveying of a printing medium in the printing device, a rolling of a sheet separation roller, or an outputting of the printing medium in an output tray of the printing device.) This may include the controller determining a time duration of a portion of the sampled signal clip associated with a print cycle event, for example, such as by applying, at the controller 104, a pattern recognition algorithm to the sampled signal clip using the training signal clip. The comparison may further include determining whether at least one parameter of the sampled signal clip differs from at least one corresponding parameter of the training signal clip by more than an assigned threshold.

At block 814 of the method 800, a determination is made as to whether the parameters of the digitized signal are within a threshold of corresponding parameters for the training signal. If they are, then the method ends (block 818), possibly to be repeated at a future time. If they are not within the threshold, then an exception notification can be provided, such as by transmitting a communication to a server (e.g. server 604), as specified in block 816 of the method 800.

IV. Conclusion

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration only and are not intended to be limiting, with the true scope being indicated by the following claims.

What is claimed:

1. A printing device, comprising:
   a chassis substantially housing a sheet feeder, a sheet conveyor, and a print applicator; and
   a printer diagnostics controller mounted on an external portion of the chassis, wherein the printer diagnostics controller includes;
      an audio sensor located external to the chassis for converting audio signals sensed by the audio sensor external to the printing device to a raw analog electrical signal;
      an analog low-pass filter for filtering out high frequency harmonics from the raw analog electrical signal to extract a filtered electrical signal that originates from at least one electro-mechanical part located in the chassis;
      an analog-to-digital port;
      a processor; and
      a memory,
      wherein the printer diagnostics controller receives the filtered electrical signal at the analog-to-digital port and samples the filtered electrical signal at a sample rate of at least twice a bandwidth of the filtered analog electrical signal to result in a sampled signal clip, determines a time duration of a portion of the sampled signal clip associated with a print cycle event and stores in the memory data associated with the sampled signal clip for comparison with corresponding data associated with a training signal clip for the print cycle event.

2. The printing device of claim 1, wherein the data associated with the sampled signal clip comprises a print cycle event indicator and at least one print cycle event feature.

3. The printing device of claim 2, wherein the at least one print cycle event feature includes data relating to at least one of audio frequency, intensity, and time duration.

4. The printing device of claim 1, wherein the printer diagnostics controller compares at least one parameter of the sampled signal clip to at least one corresponding parameter of the training signal clip associated with the print cycle event to determine whether a difference is within an assigned threshold for the print cycle event.

5. The printing device of claim 4, wherein the at least one parameter and the at least one corresponding parameter are coefficients selected from the group consisting of frequency, amplitude, and duration.

6. The printing device of claim 4, wherein, upon determining that the difference is outside the assigned threshold for the print cycle event, the printer diagnostics controller provides an exception notification.

7. The printing device of claim 6, further comprising a communication interface, wherein the printer diagnostics controller receives the training signal clip via the communication interface from a remote computer and transmits the exception notification via the communication interface to the remote computer.

8. The printing device of claim 1, further comprising a communication interface, through which the printer diagnostics controller can transmit at least a portion of the sampled signal clip.

9. The printing device of claim 1, wherein the printer diagnostics controller is configured to quantize the filtered electrical signal to create the sample signal clip.

10. A printer diagnostics system, comprising:
    a printing device, wherein the printing device comprises:
       a chassis substantially housing a sheet feeder, a sheet conveyor, and a print applicator;
       a communication interface coupling the printing device to a network;
       printer diagnostics controller externally mounted on the chassis, including;
          an audio sensor external to the chassis for converting audio signals sensed by the audio sensor external to the printing device to a raw analog electrical signal;
          an analog low-pass filter for filtering out high frequency harmonics from the raw analog electrical signal to extract a filtered electrical signal that originates from at least one electro-mechanical part located in the chassis;
          an analog-to-digital port;
          a processor; and
          a memory,
          wherein the printer diagnostics controller receives the filtered electrical signal at the analog-to-digital port and samples the filtered electrical signal at a sample rate of at least twice a bandwidth of the filtered analog electrical signal to result in a sampled signal clip, determines a time duration of a portion of the sampled signal clip associated with a print cycle event, and stores in the memory data associated with the sampled signal clip for comparison with corresponding data associated with a training signal clip for the print cycle event; and
    a server communicatively connected through the network to the printing device via the communication interface, wherein the server transmits the corresponding data associated with the training signal clip to the printing device, and wherein the corresponding data associated with the training signal clip is specific to a particular model designation of the printing device.

11. The printer diagnostics system of claim 10, wherein the printing device transmits at least a portion of the data associated with the sampled signal clip through the network via the communication interface to the server.

12. The printer diagnostics system of claim 10, wherein the data associated with the sampled signal clip comprises a print cycle event indicator and at least one print cycle event feature selected from the group consisting of audio frequency, intensity, and time duration.

13. The printer diagnostics system of claim 10, wherein the printer diagnostics controller compares at least one parameter of the sampled signal clip to at least one corresponding parameter of the training signal clip associated with the print cycle event to determine whether a difference is within an assigned threshold for the print cycle event.

14. The printer diagnostics system of claim 13, wherein, upon determining that the difference is outside the assigned threshold for the print cycle event, the printer diagnostics controller transmits an exception notification through the network via the communication interface to the server.

15. A printer diagnostics method, comprising:
receiving, at a printing device, a training signal clip from a server, wherein the training signal clip is specific to a particular model designation of the printing device;
sensing an audio signal at a location external to the printing device, wherein the audio signal originates substantially from one or more electro-mechanical parts located in a chassis of the printing device;
converting the sensed audio signal to a raw analog electrical signal;
low-pass filtering out high frequency harmonics from the raw analog electrical signal to extract a filtered electrical signal originating from the one or more electro-mechanical parts located in the chassis of the printing device;
sampling, at a printer diagnostics controller externally mounted on the chassis of the printing device, the filtered electrical signal at a sample rate of at least twice a bandwidth of the filtered analog electrical signal to result in a sampled signal clip;
determining, at the printer diagnostics controller, a time duration of a portion of the sampled signal clip associated with a print cycle event;
determining whether at least one parameter of the sampled signal clip differs from at least one corresponding parameter of the training signal clip by more than an assigned threshold; and
upon determining that the at least one parameter of the sampled signal clip differs from the at least one corresponding parameter of the training signal clip more than an assigned threshold, the printer diagnostics controller providing an exception notification.

16. The printer diagnostics method of claim 15, wherein the training signal clip is associated with at least one print cycle event.

17. The printer diagnostics method of claim 16, wherein the at least one print cycle event is selected from the group consisting of a starting of a motor of the printing device, a warming-up of the motor of the printing device, a clapping of a sheet feeder, a conveying of a printing medium in the printing device, a rolling of a sheet separation roller, and an outputting of the printing medium in an output tray of the printing device.

18. The printer diagnostics method of claim 16, wherein determining the time duration of a portion of the sampled signal clip associated with the print cycle event includes applying, at the printer diagnostics controller, a pattern recognition algorithm to the sampled signal clip using the training signal clip.

19. The printer diagnostics method of claim 15,
wherein sensing an audio signal and converting the sensed audio signal to a raw analog electrical signal are performed by an audio sensor externally mounted to the chassis of the printing device, wherein the chassis substantially houses a sheet feeder, a sheet conveyor, and a print applicator for the printing device,
wherein the training signal clip is associated with the at least one print cycle event, and
wherein the at least one print cycle event corresponds to at least one mechanical action of at least one of the sheet feeder, the sheet conveyor, or the print applicator for the printing device.

20. The printer diagnostics method of claim 15, wherein the printer diagnostics controller providing an exception notification includes the controller transmitting a communication to the server.

* * * * *